US007259330B2

(12) United States Patent
Akuzawa et al.

(10) Patent No.: US 7,259,330 B2
(45) Date of Patent: Aug. 21, 2007

(54) GROUND WIRE CONNECTING STRUCTURE

(75) Inventors: Syu Akuzawa, Hamamatsu (JP); Tetsuya Mashiko, Hamamatsu (JP)

(73) Assignee: Yamaha Marine Kabushiki Kaisha, Shizuoka-ken (JP)

(*) Notice: Subject to any disclaimer, the term of this patent is extended or adjusted under 35 U.S.C. 154(b) by 0 days.

(21) Appl. No.: 11/232,533

(22) Filed: Sep. 22, 2005

(65) Prior Publication Data

US 2006/0063444 A1 Mar. 23, 2006

(30) Foreign Application Priority Data

Sep. 22, 2004 (JP) ............................. 2004-274445

(51) Int. Cl.
*H02G 15/02* (2006.01)

(52) U.S. Cl. ...................................... 174/74 R; 174/78

(58) Field of Classification Search .............. 174/74 R, 174/74 A, 75 R, 75 C, 77 R, 78, 79
See application file for complete search history.

(56) References Cited

U.S. PATENT DOCUMENTS

| | | | | |
|---|---|---|---|---|
| 3,371,147 A * | 2/1968 | Daubenberger et al. | .... | 174/358 |
| 6,246,001 B1 * | 6/2001 | Fukui | .......................... | 174/78 |
| 6,437,245 B1 * | 8/2002 | Hayashi | .................... | 174/74 R |
| 6,781,059 B2 * | 8/2004 | Mizutani | .................. | 174/75 C |
| 6,784,368 B2 * | 8/2004 | Imai et al. | ................ | 174/74 R |
| 2001/0029120 A1 * | 10/2001 | Miyazaki et al. | ............. | 439/98 |
| 2002/0031962 A1 * | 3/2002 | Mashiko | ...................... | 440/88 |

FOREIGN PATENT DOCUMENTS

| | | |
|---|---|---|
| JP | 2002-301998 | 10/2002 |

* cited by examiner

*Primary Examiner*—William H. Mayo, III
(74) *Attorney, Agent, or Firm*—Knobbe Martens Olson & Bear LLP

(57) ABSTRACT

A ground wire connecting structure has a joint unit that is mounted to an oil tank. The joint unit has a base body to which bus bars are attached. Connector sections accommodating ground terminals are connected to the bus bars. The joint unit is coupled to a ground surface that is defined by the oil tank. The base body and the ground surface are made of a metal, such as an aluminum alloy. The base body has a contact portion for surface contact with the ground surface. Connector sections, to which external ground wires are fixed, are connected to the external ground wires and the ground terminals. As such, the external ground wires and the ground surface are electrically coupled with each other. The contact portion between the base body and the ground surface is sealed with an O-ring.

20 Claims, 12 Drawing Sheets

GROUND WIRE CONNECTING STRUCTURE

PRIORITY INFORMATION

The present application is based on and claims priority under 35 U.S.C. § 119(a-d) to Japanese Patent Application No. 2004-274445, filed on Sep. 22, 2004, the entire contents of which is expressly incorporated by reference herein.

BACKGROUND OF THE INVENTION

1. Field of the Invention

The present invention relates to ground wire connecting structures and, more particularly, to ground wire connecting structures that are mounted to an oil tank.

2. Description of the Related Art

Vehicles having electrical equipment often include ground wire connecting structures. For example, small watercraft automobiles, and boats often include in-vehicle units (e.g., in-vehicle units that include ground wire connecting structures). Japanese Patent Publication No. Hei 2002-301998 discloses an in-vehicle unit for use in automobiles. The in-vehicle unit has an attachment portion made of a conductive material. The in-vehicle unit is attached to a body panel of the vehicle via the attachment portion. A wire harness of an external circuit is connected to the in-vehicle unit. The attachment portion of the in-vehicle unit has a through hole and a projection. The body panel has a threaded hole and a recess that engages the projection of the attachment portion. When the projection engages the recess, a bolt is inserted into the through hole such that the attachment portion is coupled to the body panel. In this manner, the in-vehicle unit is attached to the body panel of the vehicle.

An internal circuit of the in-vehicle unit often has a ground circuit electrically coupled with the attachment portion. The wire harness is typically connected to the in-vehicle unit and includes a ground wire. The ground wire is connected to the body panel via the attachment portion thereby connecting the ground wire to the ground circuit. Thus, the body panel does not need a separate ground wire connecting portion.

Unfortunately these in-vehicle wire connecting structures have a relatively small attachment portion that is fixed to the body panel. A single bolt electrically couples the ground wire with the body panel. Such connections provide poor contact and the in-vehicle unit may not be securely fixed to the body panel.

SUMMARY OF THE INVENTION

An aspect of the present invention includes a ground wire connecting structure for use in a vehicle. The ground wire connecting structure can be securely mounted to a component of the vehicle.

In accordance with one aspect, a ground wire connecting structure for grounding a circuit to a watercraft component is provided. The ground wire connecting structure comprises a joint unit that has a joint unit body and a conductive member mounted thereto. At least one joint unit side connector section has a substantially tubular body that is attached to the joint unit body. The at least one joint unit side connector section is configured to accommodate a ground terminal connected to the conductive member. The joint unit is attached to a ground surface defined by a watercraft component. The ground surface is comprised of a conductive material such that the ground surface and the conductive member are electrically coupled together. An external connector section is coupled to an external ground wire and the at least one joint unit side connector section. The ground wire and the ground terminal are coupled together so that the external ground wire and the ground surface are in electrical communication. The joint unit body is comprised of a conductive material that is in electrically communication with the conductive member. The joint unit body has a contact portion in surface contact with the ground surface. The joint unit body is detachably attached to the ground surface via at least one fastening assembly.

In yet another aspect, a watercraft comprises a first electrical device and a ground wire connecting structure. The ground wire connecting structure comprises a joint unit having a joint unit body and a first joint unit side connector section attached to the joint unit body. The first electrical device is connected to the first joint unit side connector section of the ground wire connecting structure by at least one ground wire. The joint unit is attached to a ground surface defined by a watercraft component. The ground surface and a contact surface of the joint unit contact each other and are made of a conductive material such that the ground surface and a first conductive member mounted to the joint unit body are electrically coupled together. A fastening assembly couples the joint unit body to the ground surface.

In another aspect, the ground wire connecting structure has a joint unit body to which a constructive member is attached. The joint unit body can function as an attachment portion. Also, the joint unit body has a contact portion for surface contact with a ground surface. Thus, the area of the contact portion can be determined by choosing the size of the joint unit body. By enlarging the size of the contact portion, the joint unit body can contact the ground surface. The joint unit body can be securely fixed to the ground surface by one or more fasteners. Further, because the joint unit body forms a base body of the joint unit, the ground wire connecting structure can be made smaller as the joint unit body is reduced in size.

BRIEF DESCRIPTION OF THE DRAWINGS

The above-mentioned and other features of the invention disclosed herein are described below with reference to the drawings of a preferred embodiment. The illustrated embodiment is intended to illustrate, but not to limit the invention. The drawings contain the following Figures.

DETAILED DESCRIPTION OF THE PREFERRED EMBODIMENT

Figure 1:
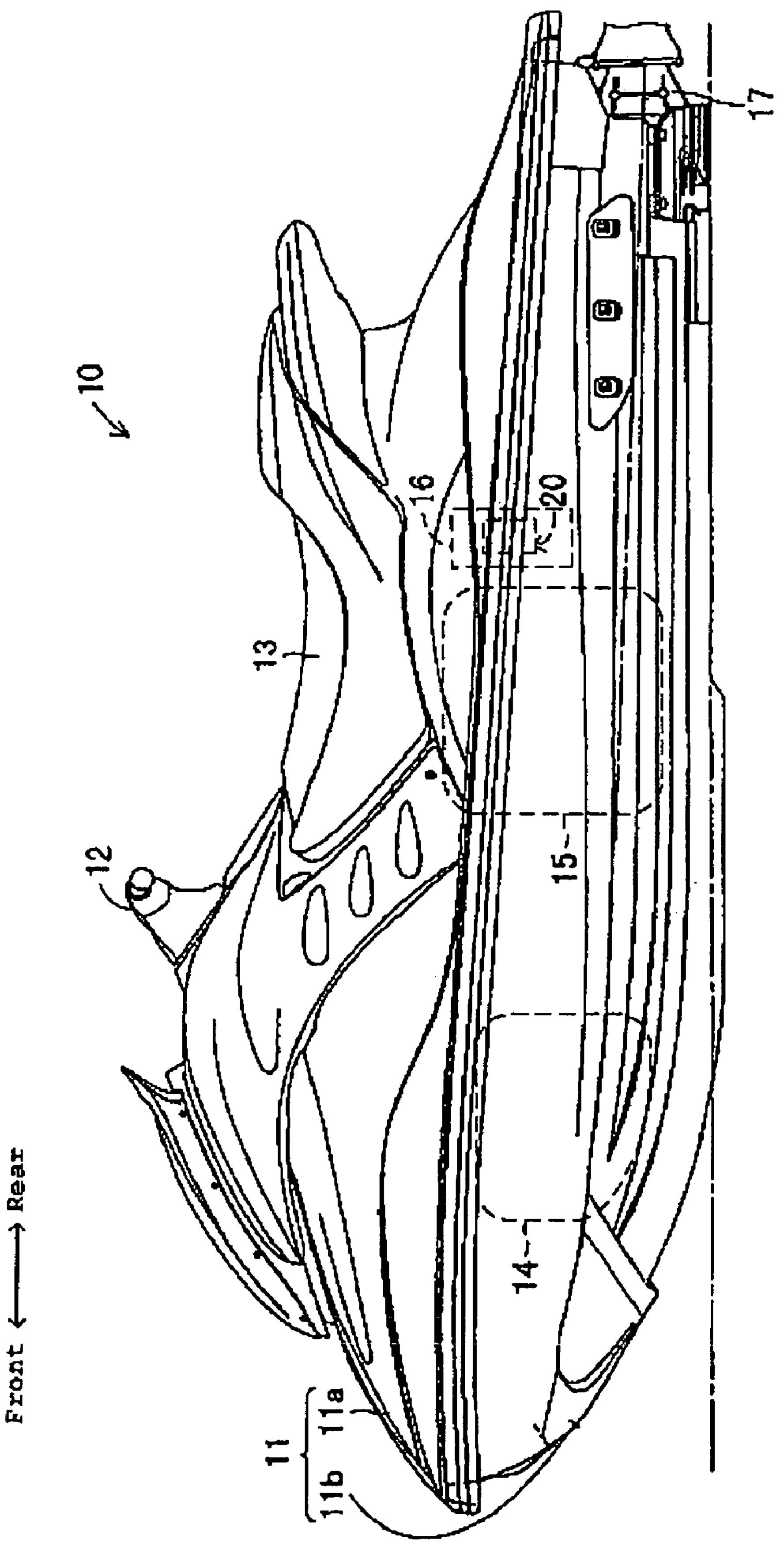
FIG. 1 is a side view of a watercraft that has a ground wire connecting structure.
Figure 2:
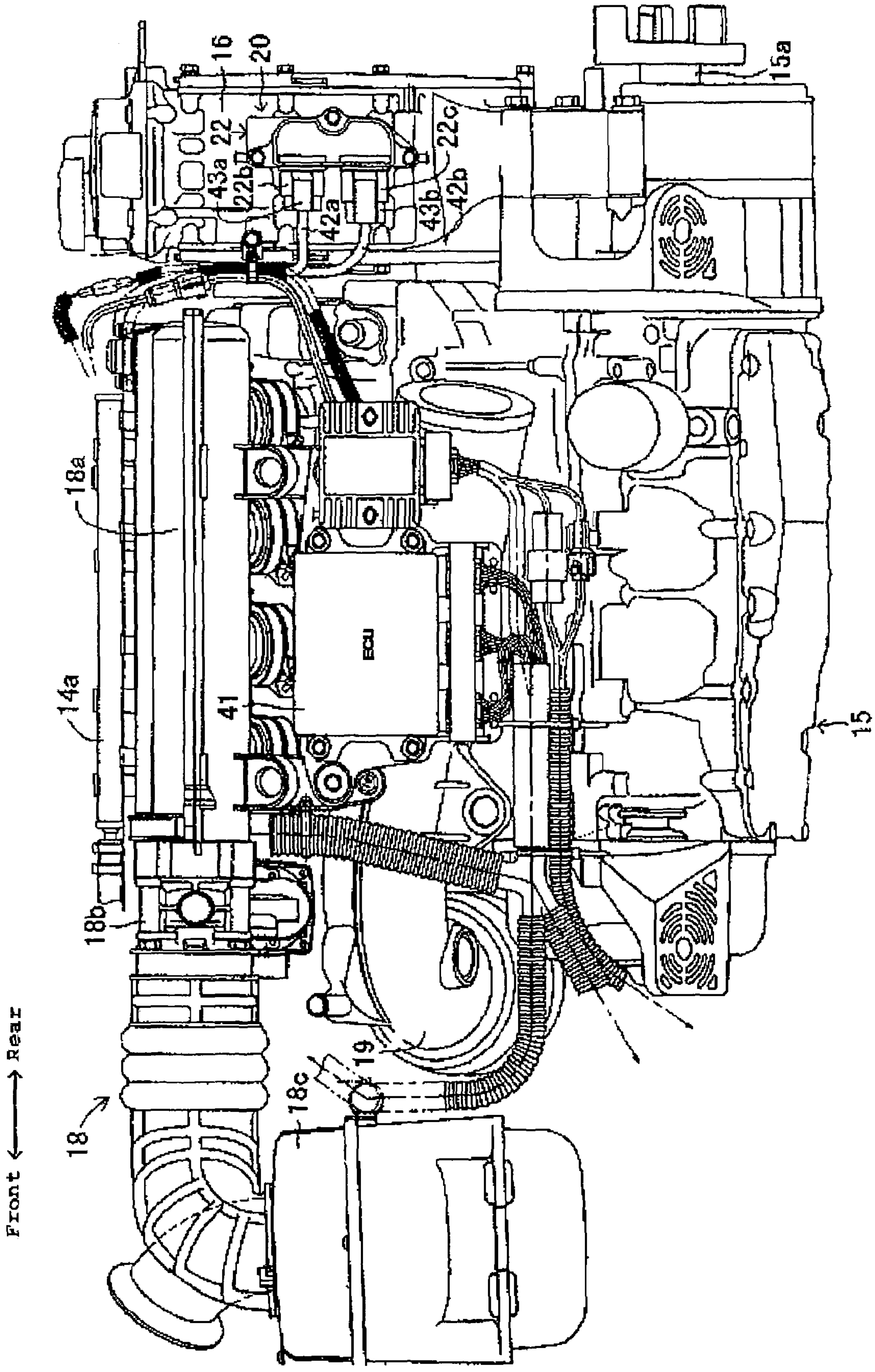
FIG. 2 is a side elevational view of an engine of the watercraft of FIG. 1 having a ground wire connecting structure.

With reference to FIGS. 1 and 2, an overall configuration of a personal watercraft 10 and its engine 15 and a ground wire connecting structure is described below. The described ground wire connecting structure has particular utility with personal watercraft, and thus, it is described in the context of personal watercraft. However, the ground wire connecting structure can also be applied to other types of vehicles, such as small jet boats and other vehicles that feature marine drives, automobiles, motorcycles, scooters, and the like, as well as industrial stationary engines, generators, and other engines, for example. The terms "upper," "lower," "top," "bottom," "left," "right," "fore," "aft," and the like may be used to describe the watercraft 10. These terms are used in reference to the illustrated embodiment and are from the perspective of a rider straddling a seat 13.

The watercraft 10 has a body 11 that includes an upper hull section 11*a* and a lower hull section 11*b*. The upper and lower hull sections 11*a*, 11*b* cooperate to define an internal cavity that can form an engine compartment. The engine compartment can be defined by a forward and rearward bulkhead; however, other configurations are also possible. The engine compartment is preferably located under the seat 13, but other locations are also possible (e.g. beneath the control mast or the bow).

The watercraft 10 also includes handlebars 12 in front of the seat 13 and on top of the upper hull section 11*a*. The seat 13 is preferably positioned centrally along the upper side of the upper hull section 11*a*. Additionally, foot mounting steps can be formed at the sides of the body 11. Preferably one foot mounting step is on the left side and another foot mounting step is on the right side of the seat 13. The seat 13 has a saddle shape, so that a rider can sit on the seat 13 in a straddle fashion and often is referred to as a straddle-type seat; however, other types of seats can also be employed.

With continued reference to FIG. 1, a fuel tank 14 for storing fuel is disposed in front of the engine 15. Some of the internal components of the watercraft 10 are shown in phantom while others are omitted for clarity. Fuel from the fuel tank 14 can be delivered to the engine 15. The illustrated fuel tank 14 is placed at a forward location in a bottom portion of the body 11. An oil tank 16 preferably is positioned rearwardly of the engine 15. The oil tank 16 stores lubricant oil that is delivered to the engine 15. The fuel tank 14 and the oil tank 16 can be at other locations based on the design of the engine compartment, engine design, and the like.

As shown in FIG. 2, the engine 15 preferably is a four cycle stroke, four cylinder engine. The engine 15 introduces a mixture of fuel and air through intake ports and discharges exhaust gases through exhaust ports. The mixture supplied into the engine 15 is combusted by an ignition of an ignition system (not shown) which is provided in the engine 15. The flow of the air-fuel mixture is controlled by the intake valves and is ignited by an ignition device of the engine 15. As such, the ignition device causes explosions that cause reciprocation of the pistons in the engine 15. The reciprocal movement of the pistons drives a crankshaft 15*a*. The crankshaft 15*a* is coupled with an impeller shaft to transmit its rotational power to the impeller shaft to rotate it.

The illustrated engine merely exemplifies one type of engine which can have one or more embodiments of the present ground wire connecting structure. Engines having a different number of cylinders, other cylinder arrangements, various cylinder orientations (e.g., upright cylinder banks, V-type, and W-type), and operating on various combustion principles (e.g., four stroke, crankcase compression two-stroke, diesel, and rotary) are all practicable for use with the ground wire connecting structures disclosed herein.

With reference again to FIG. 1, a jet pump unit 17 is driven by the engine 15 to propel the illustrated watercraft 10. An impeller shaft can extend between the crankshaft 15*a* of the engine 15 and the jet pump unit 17. A coupling member can be positioned between the impeller shaft and the crankshaft 15*a*. The crankshaft 15*a* imparts rotary motion to the impeller shaft which, in turn, drives the pump unit 17.

The jet pump unit 17 is disposed within a tunnel formed on the underside of the lower hull section 11*b*. The jet pump unit 17 preferably comprises a discharge nozzle and a steering nozzle to provide steering action. The steering nozzle is pivotally mounted about a generally vertical steering axis. The jet pump unit 17 can be connected to the handlebars 12 by a cable or other suitable arrangement so that a rider can pivot the steering nozzle for steering the watercraft 10. Water introduced through the inlet of the jet pump unit 17 is discharged out from the water jet nozzle by the rotation of the impeller to propel the watercraft 10. Other types of marine drives can also be used to propel the watercraft 10 depending upon the application.

With reference to FIG. 2, an intake system 18 comprises an intake conduit 18a connected to the intake ports of the engine 15. The intake system 18 also includes an intake box 18*c* and a throttle device 18*b* connected to an upstream end of the intake conduit 18*a*. The intake system 18 draws in outside ambient air through the intake box 18*c* and then supplies the air to the engine 15. A throttle valve of the throttle device 18*b* selectively adjusts the amount of air delivered to the engine 15. That is, the throttle valve can be opened and closed to accurately control the amount of air delivered to the engine 15 via the intake conduit 18*a*. The fuel supplied from the fuel tank 14 through a fuel system 14*a* is mixed with the air supplied to the engine 15. The mixture is then ignited to drive the pistons of the engine 15.

An exhaust system 19 includes an exhaust conduit 19*a* that receives exhaust gases outputted from the engine 15. The exhaust gases pass through the exhaust conduit 19*a* and eventually to the outside environment. The exhaust system 19 preferably emits exhaust gases discharged from the engine 15 to an external location at a rear end portion of the body 11.

The upstream end of the exhaust conduit 19*a* preferably is in communication with the exhaust valves of the engine 15. The exhaust conduit 19*a* extends from each exhaust valve so that the exhaust gases from the combustion chambers of the engine 15 are mixed within and flow through the exhaust conduit 19*a*.

With reference to FIGS. 1 and 2, a ground wire connecting structure 20 and/or associated oil tank 16 are positioned near the engine block of the engine 15. The illustrated ground wire connecting structure 20 is disposed on a surface of the oil tank 16 positioned at the aft end of the engine 15. Other positions of the ground wire connecting structure 20 and oil tank 16 are also possible. Additionally, the ground wire connecting structures can be mounted at other suitable locations of the watercraft.

Figure 3:
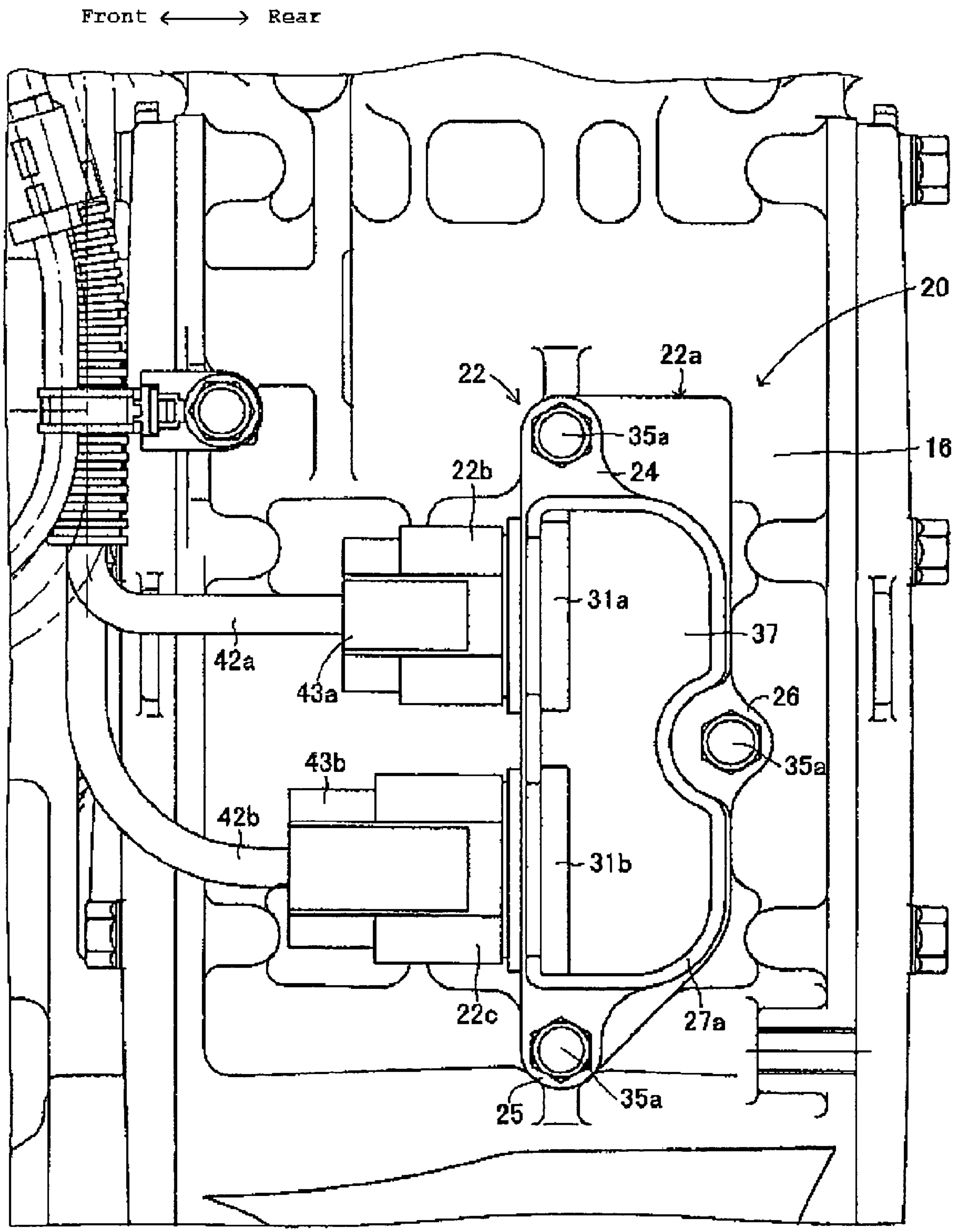
FIG. 3 is an enlarged side view of a portion of the engine of FIG. 2 and the ground wire connecting structure.
Figure 4:
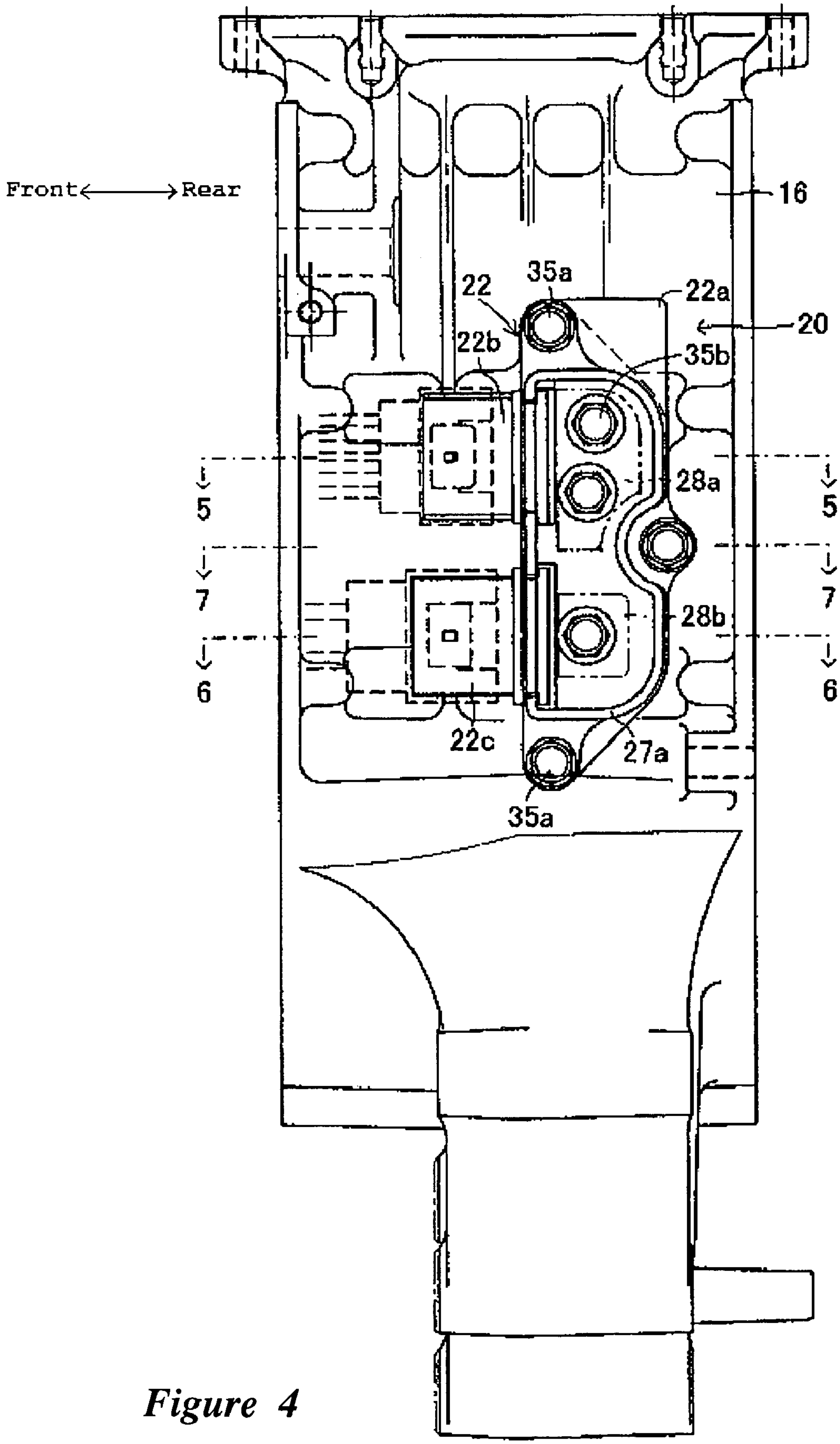
FIG. 4 is a side view of a joint unit of the ground wire connecting structure that is coupled to an oil tank of the engine of FIG. 2.

With reference to FIGS. 3 and 4, the ground wire connecting structure 20 includes a joint unit 22. A ground surface 21*a* (see FIGS. 5-7) is defined by the surface of the oil tank 16. The ground surface 21*a* can be a generally flat surface that extends along a portion of a surface of the oil tank 16. The illustrated ground surface 21*a* is an outwardly facing surface configured to mate with at least a portion of the joint unit 22. The oil tank 16 can define ground surfaces of various configurations. Other body members, panels or surfaces of the watercraft 10 also can define a ground surface 21*a* that engages at least a portion of the ground wire connecting structure 20. One or more ground wire connecting structures can thus be mounted at various suitable locations in the watercraft 10.

The joint unit 22 is preferably mounted to the ground surface 21*a* so that the joint unit 22 is in electrical communication with the oil tank 16. For example, the ground surface 21*a* is preferably defined by one or more surfaces of an attachment support 21 that extends from the surface of the oil tank 16. In the illustrated configuration, the attachment support 21 has a centrally disposed recess 21*b*. A marginal area of the ground surface 21*a* has three threaded holes 21*c* (only one is shown). As such, two ground surfaces 21*a* are spaced apart from each other on either side of the recess 21*b*. The oil tank 16 is preferably comprised of aluminum and/or its alloys, or any other suitable material.

The joint unit 22 includes a joint unit body or base body 22*a*. The joint unit 22 is preferably constructed of aluminum and/or its alloy. In some embodiments, the joint unit 22 and the oil tank 16 are made of the same material (e.g., the same aluminum alloy). The attachment support 21 and the joint unit 22 thus can have similar physical properties (e.g., electrical properties including electrical conductivity). It should be appreciated that the joint body 22 and oil tank 16 can be formed from a plurality of materials. However, the mating surfaces (e.g., the ground surface 21*a* and the contact portion 23) can have similar properties, and preferably are comprised of similar or identical materials (e.g., the same metallic material). The ground wire connecting structure 20 can comprise a plurality of materials. For example, the joint body 22 and oil tank 16 can comprise metal, while the pair of connector sections 22*b* (FIG. 5), 22*c* (FIG. 6) is preferably made of another material.

Figure 5:
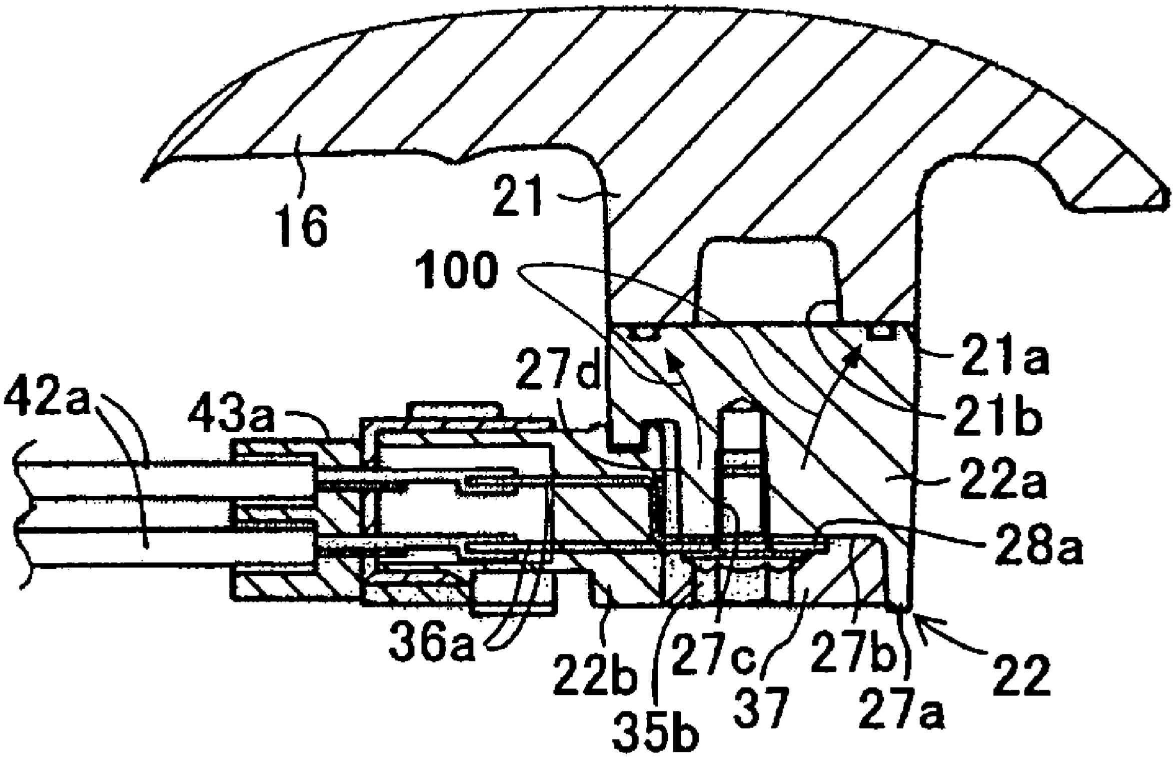
FIG. 5 is a cross-sectional view taken along the line 5-5 of FIG. 4.
Figure 8:
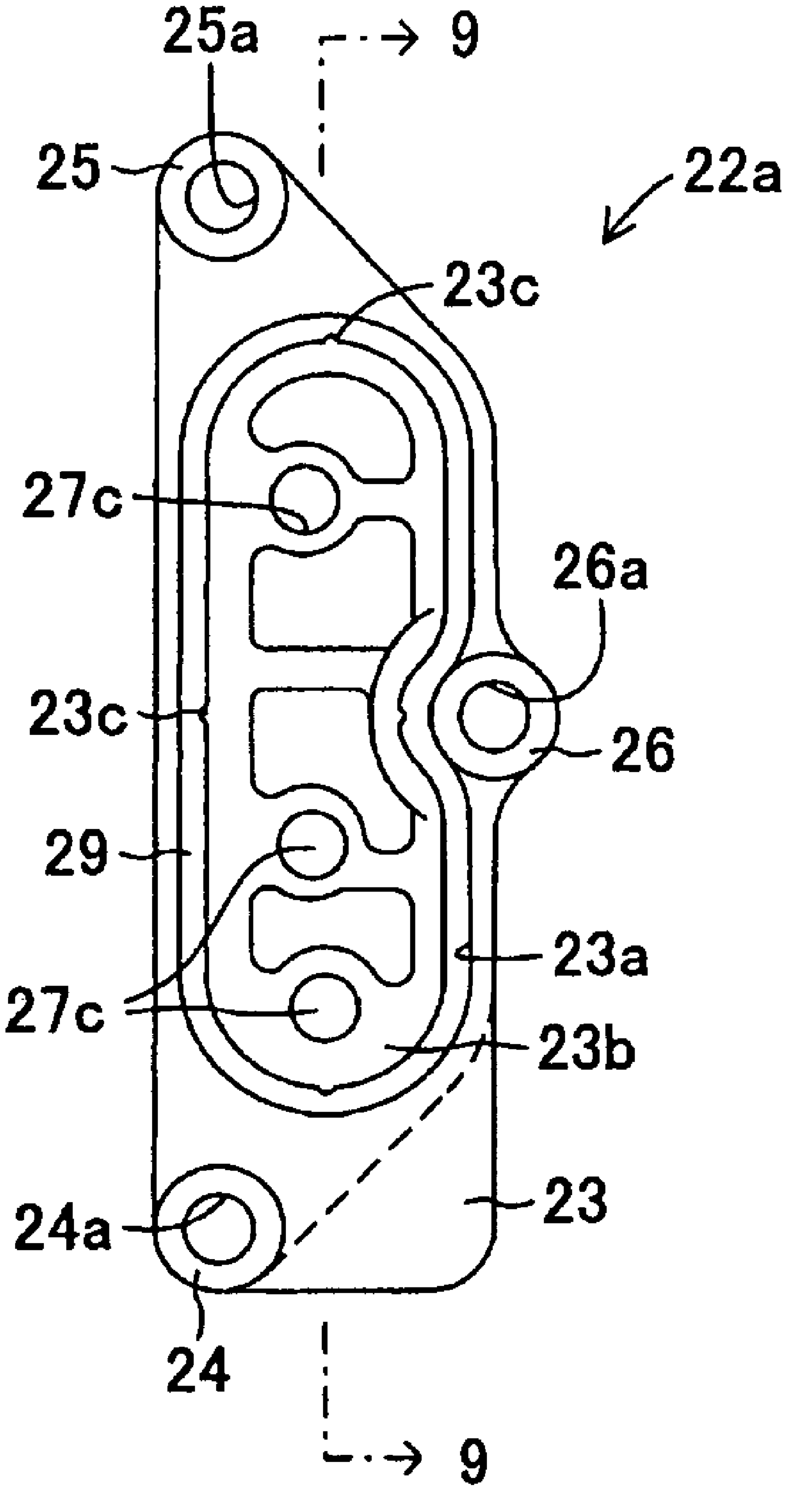
FIG. 8 is a rear view of a back side of a base body of the ground wire connecting structure of FIG. 2.
Figure 9:
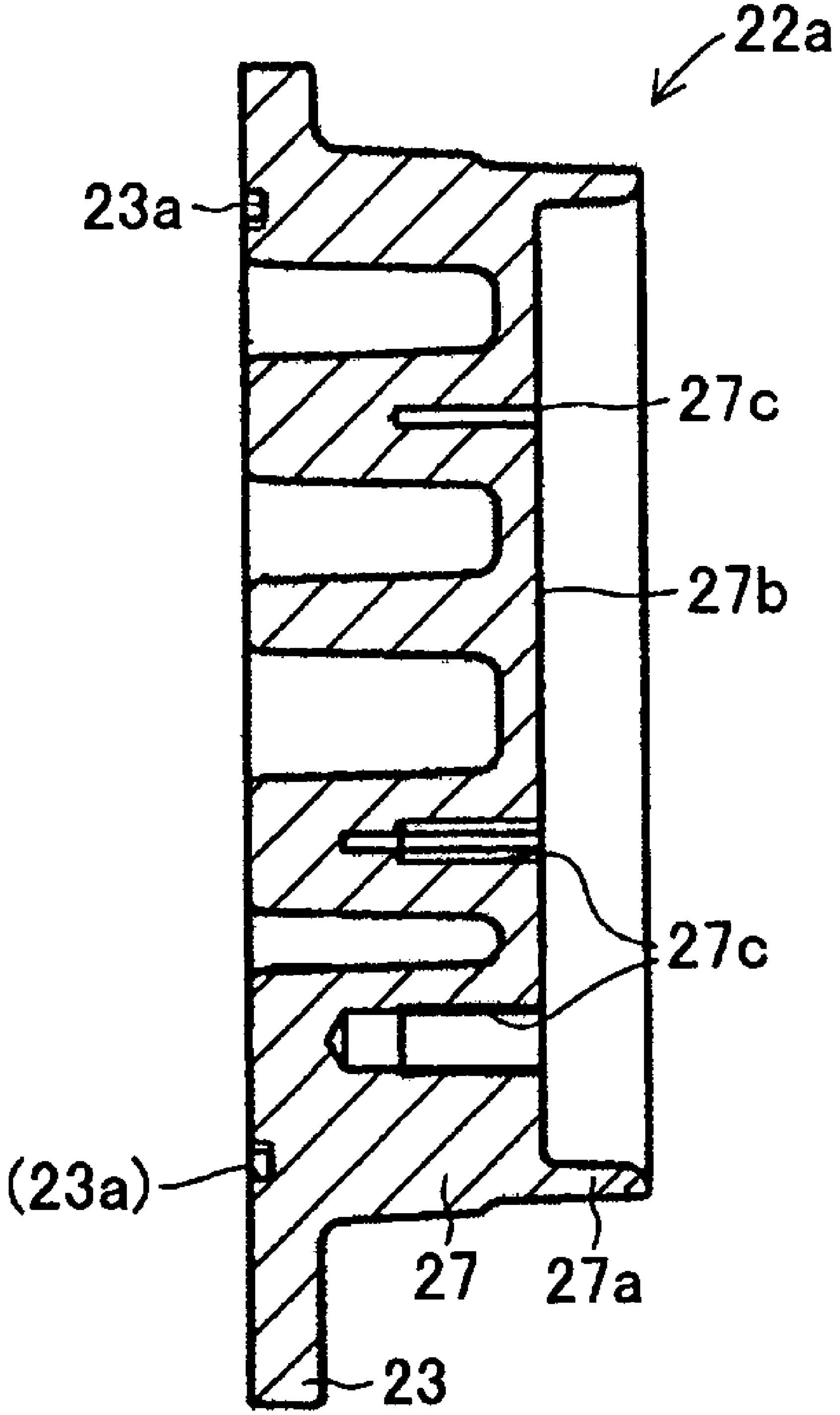
FIG. 9 is a cross-sectional view taken along the line 9-9 of FIG. 8.

As shown in FIGS. 8 and 9, the base body 22*a* includes a somewhat flat contact portion 23 that is in surface contact with the ground surface 21*a* of the oil tank 16. As shown in FIG. 5, the contact portion 23 engages the ground surface 21*a*. The contact portion 23 preferably defines a contact surface 23*b* for mating with the ground surface 21*a*. Through-hole forming portions 24, 25, 26 each include at least one through-hole. The illustrated base body 22*a* has three threaded holes 21*c* formed in the contact portion 23. The base body 22*a* also includes an attachment portion 27 (FIG. 9). Conductive members 28*a*, 28*b* (see FIGS. 5 and 6) are attached to the attachment portion 27 as shown in FIG. 4. The illustrated conductive members 28*a*, 28*b* are in the form of bus bars, although the conductive members can have other designs.

A back side (i.e., the side opposing the ground surface 21*a*) of the flat portion 23 is generally shaped as a trapezoidal structure in the illustrated configuration. The illustrated base side has a generally elliptically shaped annular groove 23*a* as shown in FIG. 8. The groove 23*a* can have various axial cross-sectional profiles. Non-limiting exemplary grooves can have semi-circular, polygonal, curved, or other suitable axial cross-sectional configurations based on the intended application. The groove 23*a* is in a center portion of the contact portion 23 positioned along the longitudinal axis of the base body 22*a*. However, the groove 23*a* can be disposed at other locations. The groove 23*a* is preferably positioned such that it is aligned with the attachment support 21 of the oil tank 16. In such embodiments, the groove 23*a* can cooperate with a sealing member to enhance the connection between the ground wire connecting structure 20.

The contact surface 23*b* is surrounded by the groove 23*a*. The contact portion 23 is configured to contact the oil tank 16 (see FIG. 8). The roughness (e.g., the degree of surface roughness) of both the contact portion 23 and the ground surface 21*a* can be Ra 3.2 μm or higher. The flatness thereof can be about 0.1 mm. As such, a sufficient conductivity between the contact portion 23 and the ground surface 21*a* can be provided. The surface properties of the contact portion 23 and the ground surface 21*a* can be selected to achieve the desired connection (e.g., electrical connection) between the contact portion 23 and the ground surface 21*a*. Roughness, flatness, electrical conductivity, and other surface properties can be selected on the intended application.

The contact area between the contact surface 23*b* of the joint unit body 22*a* and the ground surface 21*a* is preferably equal to or greater than a cross-sectional area of one or more ground terminals. Current flowing from an external source (e.g., a ground wire) can effectively flow to the ground surface 21*a*. The connection between the contact portion 23 of the joint unit body 22*a* and the ground surface 21*a* can be selected based on the roughness of the contact surface of the contact portion 32*b* and the ground surface 21*a*. When the roughness of the surfaces is increased, the contact area between the contact surface 23*b* and the ground surface 21*a* can be reduced. Accordingly, the area of the contact surface 23*b* and the ground surface 21*a* can be increased to achieve a suitable electrical connection between the joint unit body 22*a* and the oil tank 16. In some embodiments, an effective contact area between the contact portion 23 of the joint unit body 22*a* and the ground surface 21*a* can be equal to or greater than the cross-sectional area of at least one ground terminal, although other configurations are possible.

With reference to FIG. 8, a sealing member 29 can cooperate with the groove 23*a* to effectively from a seal between the base body 22*a* and the oil tank 16. The sealing member 29 is preferably an O-ring made of a rubber material and is configured to fit in the groove 23*a*. An inner peripheral edge of the groove 23*a* has four anti-slip ribs 23*c* spaced apart from each other to inhibit movement of the O-ring 29. That is, the anti-slip ribs can secure the O-ring 29 in the groove 23*a*. Preferably the O-ring 29 does not slip out of the groove 23*a* or move a substantial distance during operation. Various types and numbers of anti-slip structures can be employed to inhibit relative movement between the O-ring 29 and the groove 32*a*. For example, ribs, protrusions, adhesives, texturing, serrations, spikes and other anti-slip structures can be employed. Alternatively, the groove 23*a* may not have any anti-slip structures.

The through-hole forming portions 24 and 25 are preferably positioned at relatively thicker portions at opposing ends of the base body 22*a*. As shown in FIGS. 3 and 8, the through-hole forming portion 25 is positioned at an uppermost end of the base body 22*a*. The through-hole forming portion 24 is positioned at a lower-most end of the base body 22*a*. The through-hole forming portion 26 is generally positioned at a center portion at one side of the base body 22*a*. The through-hole forming portion 26 is proximate the side that is shorter than the other, wherein both sides extend in the longitudinal direction. The illustrated through-hole forming portion 26 is positioned generally midway along the base body in the vertical direction.

Figure 7:
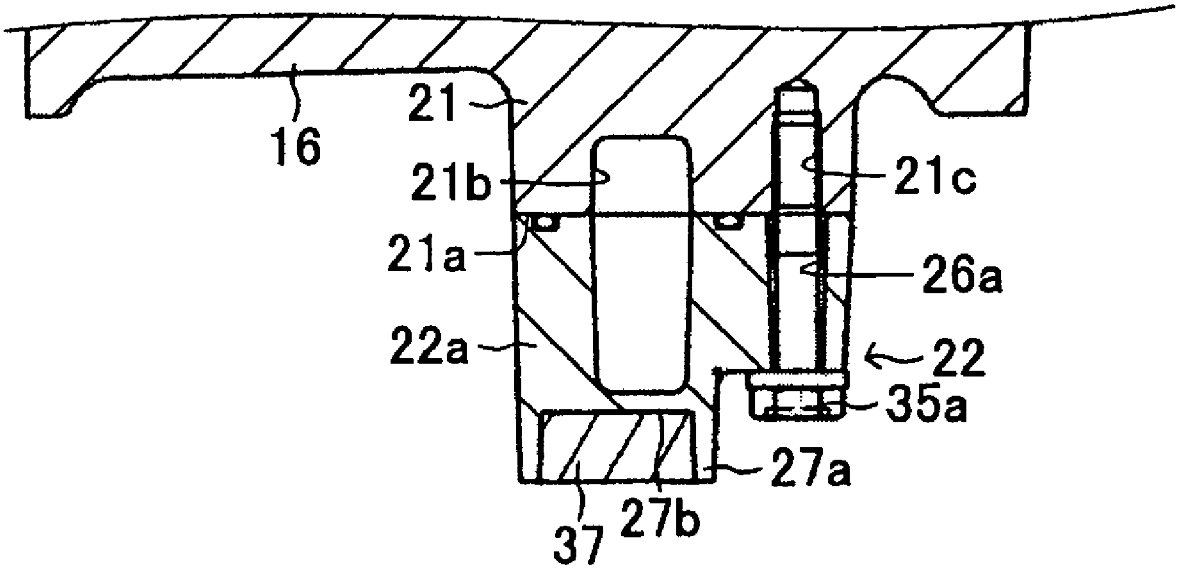
FIG. 7 is a cross-sectional view taken along the line 7-7 of FIG. 4.

The through hole forming portions 24, 25, 26 have centrally disposed through holes 24*a*, 25*a*, 26*a*, respectively. Each of the through holes 24*a*, 25*a*, 26*a* extends from the front side to the back side of the base body 22*a*. The illustrated through holes 24*a*, 25*a*, 26*a* correspond to the three threaded holes 21*c* (FIG. 7). The threaded holes 21*c* are preferably formed in the connecting support 22, or other portion of the oil tank 16. The base body 22*a* of the joint body 22 is coupled to the ground surface 21*a* of the oil tank 16 by inserting bolts 35*a* through corresponding through holes 24*a*, 25*a*, 26a. Bolts 35*a* are then screwed into the threaded holes 21*c* thereby securely coupling the base body 22*a* to the connecting support 21 of the oil tank 16.

The attachment portion 27 (FIG. 9) includes a projection extending outwardly from a front surface of the flat portion 23. A peripheral wall 27*a* extends from a peripheral edge of the projection to define an attachment recess 27*b*. That is, the attachment recess 27*b* is defined and surrounded by the peripheral wall 27*a*. As shown in FIGS. 8 and 9, the attachment recess 27*b* has three threaded holes 27*c* spaced apart from each other. Each of the threaded holes 27*c* can have the same diameter and the same depth, although the threaded holes 27*c* can also have different dimensions if desired. A skilled artisan can select the desired number of threaded holes 27*c* to be employed.

Figure 6:
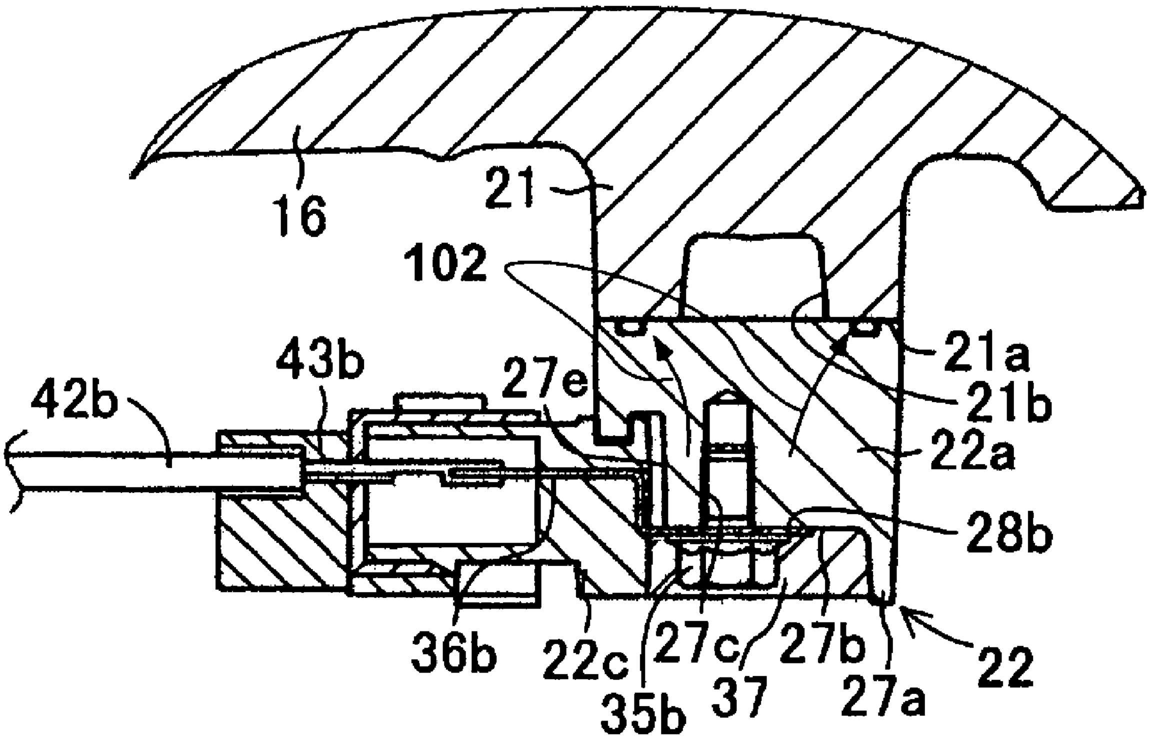
FIG. 6 is a cross-sectional view taken along the line 6-6 of FIG. 4.

A portion of the peripheral wall 27*a* is positioned forward relative the watercraft 10 and has two upper and lower notches. As shown in FIGS. 5 and 6, the attachment portion 27 has engaging recesses 27*d*, 27*e* at positions corresponding to the notches. The connector sections 22*b*, 22*c* are coupled to the notches of the peripheral wall 27*a* and the engaging recesses 27*d*, 27*e*.

Figure 10:
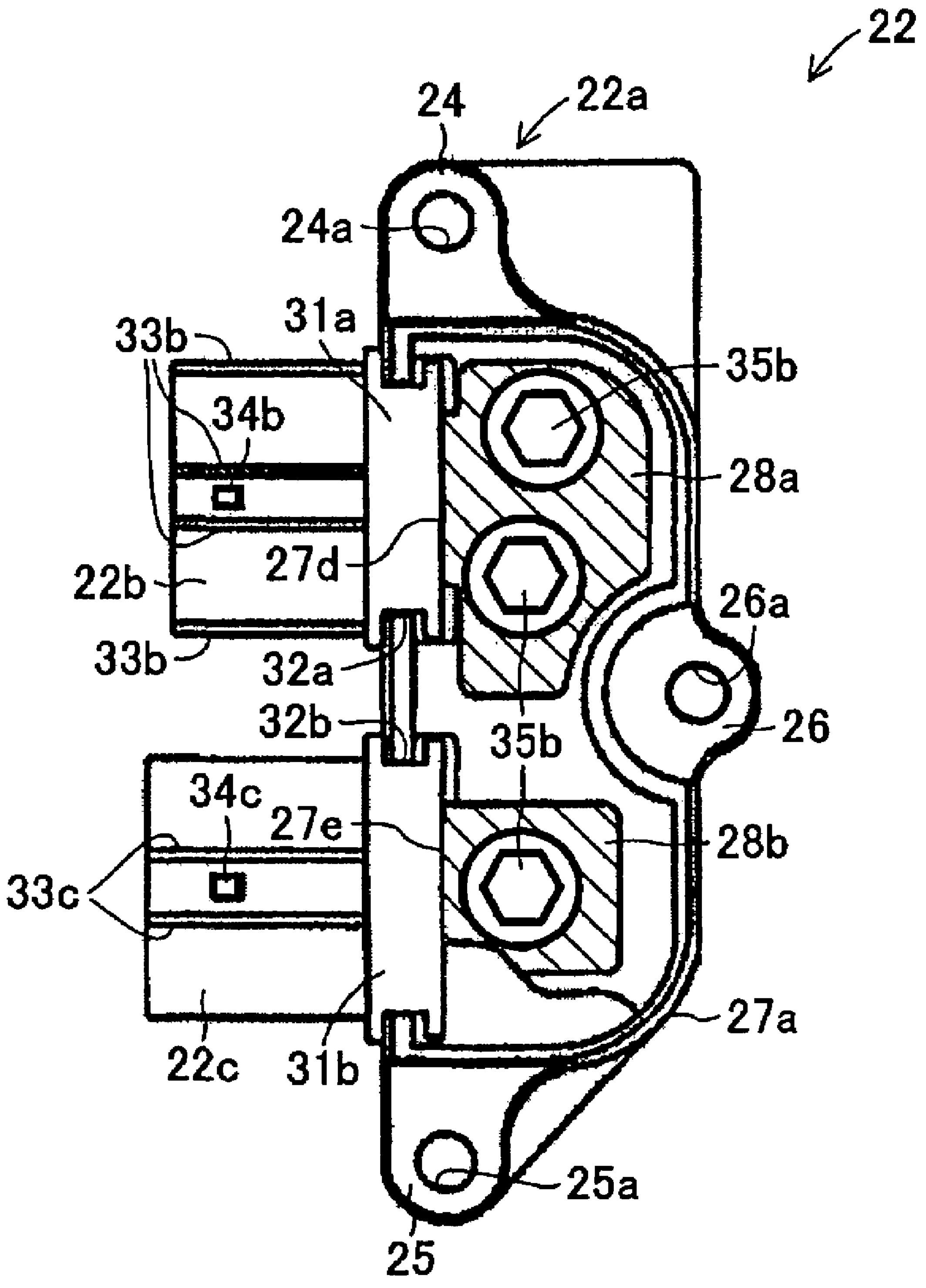
FIG. 10 is a side view of the joint unit of the ground wire connecting structure removed from the oil tank.
Figure 11:
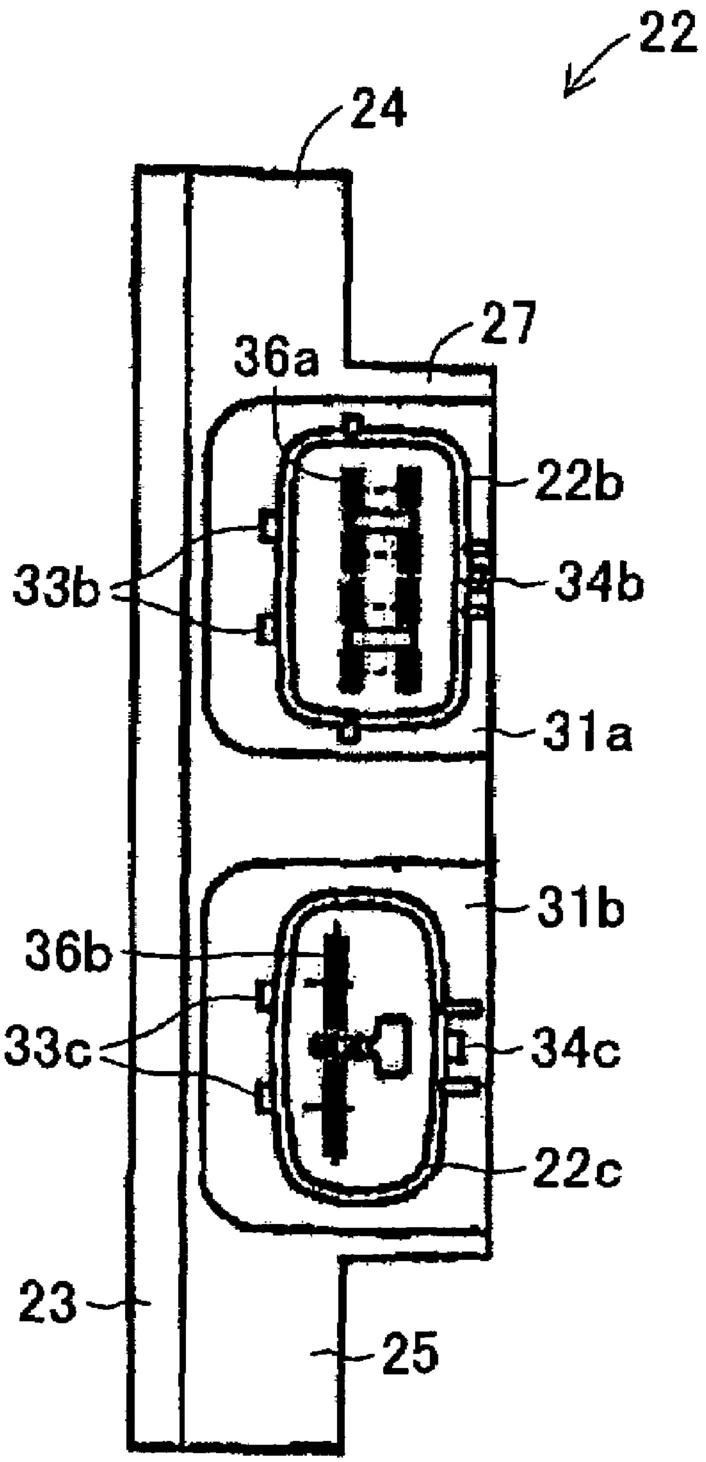
FIG. 11 is a front view of the joint unit of FIG. 10.
Figure 12:
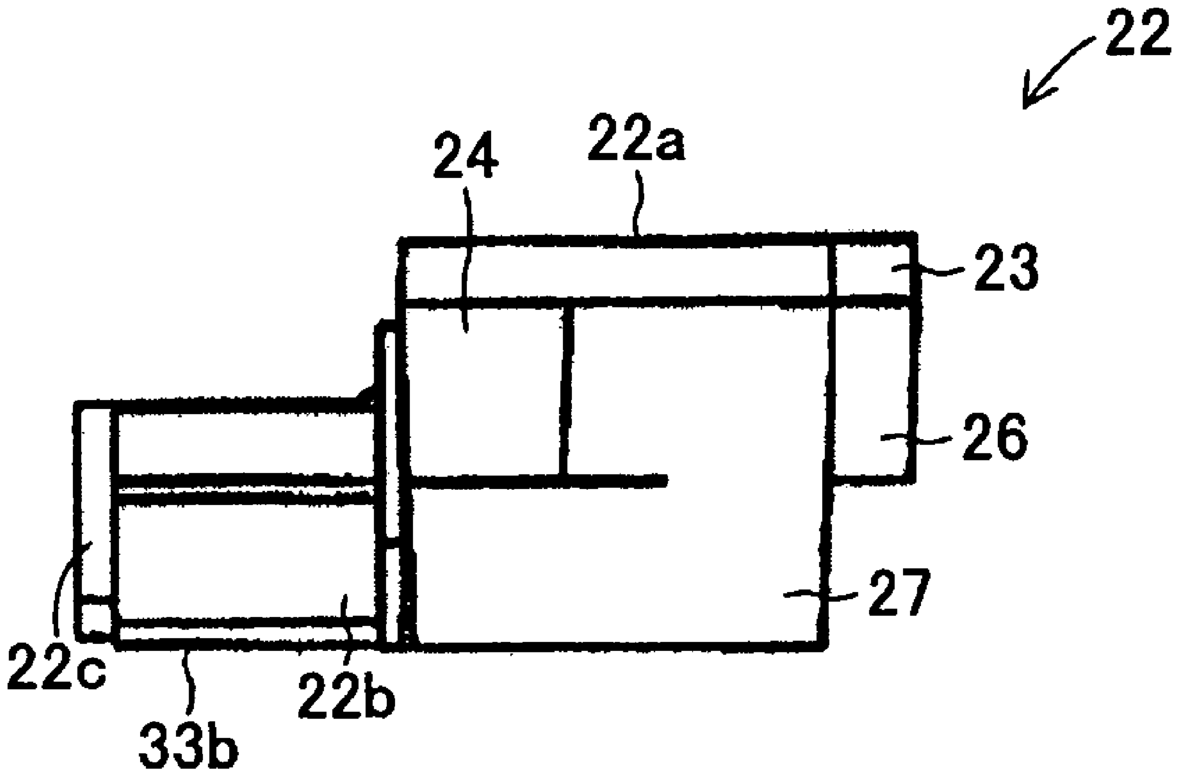
FIG. 12 is a top plan view of the joint unit of FIG. 10.

With respect to FIGS. 10-12, each connector section 22*b*, 22*c* has a somewhat rectangular shape. The illustrated connector sections 22*b*, 22*c* have axial cross-sectional profiles that are substantially rectangular, as shown in FIG. 11. The connector section 22*b* can be coupled to the engaging recess 27*d* and to the upper notch of the peripheral wall 27*a* via a fixing portion 31*a*. The fixing portion 31*a* is preferably positioned at a base end of the connector section 22*b*. That is, one end of the connector section 22*b* is mounted to the fixing portion 31*a*. The connector section 22*c* is connected to the engaging recess 27*e* and to the lower notch of the peripheral wall 27*a* via a fixing portion 31*b*. The fixing portion 31*b* is preferably positioned at a base end of the connector section 22*c*. Each fixing portion 31*a*, 31*b* has a somewhat annular body. The periphery of each fixing portion 31*a*, 31*b* has an engaging groove 32*a*, 32*b*, respectively. In the illustrated embodiment, the engaging groove 32*a* engages the engaging recess 27*d* and the upper notch of the peripheral wall 27*a* to fix the fixing portion 31*a* to the base body 22*a*. The engaging groove 32*b* engages the engaging recess 27*e* and the lower notch of the peripheral wall 27*a* to fix the fixing portion 31*b* to the base body 22*a*.

With continued reference to FIGS. 10 and 11, the connector section 22*b* has a plurality of elongated protrusions 33*b*. The illustrated connector section 22*b* includes a pair of protrusions 33*b* in the form of ribs extending in the fore and aft direction along its front side and the back side. The ribs 33*b* extend outwardly from the vertically extending walls of the connector section 22*b*. The connector section 22*b* can have at least one rib 33*b* extending in the fore and aft direction on the upper and lower horizontally extending walls. At least one projection 34*b* extends outwardly from a portion of the front side of the connector section 22*b*, preferably extending from between the projected ribs 33*b*.

The connector section 22*c* preferably has a greater axial length than the connector section 22*b*, as shown in FIG. 10. As shown in FIG. 11, the traverse dimension of the connector section 22*c* is preferably less than the transverse dimension of the connector section 22*b*. Thus, the width of the connector section 22*c* is generally less than the width of the connector section 22*b*. It should be appreciated that the connector sections 22*b*, 22*c* can have other configurations based on the intended application and harness configurations.

The connector section 22*c* has a pair of projected ribs 33*c* extending in the fore and aft direction on its front and back sides. The connector section 22*c* also preferably includes at least one projection 34*c* projecting from a portion of the front side of the connector section 22*c*. The at least one projection 34*c* is preferably positioned between the projected ribs 33*c*. In the illustrated embodiment, a single projection extends from a corresponding connector section 22*b*, 22*c*.

With reference to FIG. 10, bus bars 28*a*, 28*b* are provided for electrical communication between the body 22*a* and the connector sections 22*b*, 22*c*. The bus bar 28*a* is preferably formed with a plurality of conductive plates. The bus bar 28*a* preferably includes a pair of conductive plates stacked on each other. Two through holes for mounting can extend through the bus bar 28*a*. A bolt 35*b* can be disposed through a corresponding through hole for mounting of the bus bar 28 to the joint body 22. In the illustrated embodiment, the bus bar 28*a* is mounted to the joint body 22 by a pair of bolts 35*b*. A skilled artisan can select the number of bolts used to mount the bus bar 28. The bolts 35*b* can be inserted into the through-holes, and then screwed into one of the threaded holes 27*c* to fix the bus bar 28*a* to the attachment recess 27*b*. One of the conductive plates of the bus bar 28*a* positioned on the back side of the connector section 22*b* can be bent towards the back side. The two conductive plates can extend forwardly with a substantially constant distance between each other. A plurality of ground terminals 36*a* can extend laterally (preferably forwardly) from the side of the bus bar 28*a*, as shown in FIG. 5.

The bus bar 28*b* includes at least one conductive plate formed with one through hole. As shown in FIG. 6, the bolt 35*b* can be positioned within the through hole and can be screwed down to a corresponding threaded hole 27*c*. The bolt 35*b* can couple the bus bar 28*b* to the attachment recess 27*b*. One or more ground terminals 36*b* extend laterally (preferably forwardly) from the bus bar 28*b*. The illustrated bus bar 28*b* includes a single conductive plate and the associated ground terminal 36*b*.

At least a portion of the joint unit body 22*a* can be positioned between at least one of the bus bars and the ground surface 21*a*. One or more flow paths can be defined by the joint body 22*a*. A flow path is preferably defined between the bus bars 28*a*, 28*b* and the ground surface 21*a*. The flow path can be defined by the joint body 22. As shown in FIG. 5, a flow path 100 extends between the bus bar 28*a* and the ground surface 21*a*. As such, current can flow between the bus bar 28*a* and the ground surface 21*a* via the joint body 22. Similarly, the joint body 22 can define a flow path 102 between the bus bar 28*b* and the ground surface 21*a*.

A resin material can form a layer 37 that surrounds at least a portion of the ground terminals and at least partially fills the attachment recess 27*b*. At least a portion of the bus bars 28*a*, 28*b* are interposed between the layer 37 and the joint body 22. The layer 37 can substantially prevent water or other contaminates from contacting the bus bars 28*a*, 28*b*. Other types of materials can be used to form the layer 37 or to otherwise protect the bus bars 28*a*, 28*b*.

The illustrated layer 37 is a sealing layer formed at a fixing portion 31*a*, 31*b*, where the bus bars are coupled to the joint unit body 22*a*. The layer 37 can be formed by applying a molten resin material into the attachment recess 27*b* over the bus-bars. The resin material solidifies thereby forming the sealing layer 37. The layer 37 can also couple the bus bars to the joint unit body 22*a*. Further, water or the like can be inhibited (preferably substantially prevented) from entering any space between the joint unit body 22*a* and the ground surface 21*a*, and also locations where the fixing member is attached.

The watercraft 10 can contain various electric equipment, such as an electric control unit (ECU) 41 (FIG. 2), an injection device, an electronically operated throttling device, ignition system, and other devices typically found in watercraft. These electrical components can be contained within the body 11 of the watercraft. As shown in FIGS. 2 and 3, wire harnesses 42*a*, 42*b* can extend from one or more of these devices to the ground wire connecting structure 20. Each wire harness is configured to provide electrical communication between one or more of these electrical components and the ground wire connection structure 20. In some embodiments, the wire harness 42*a* comprises a bundle of ground wires. Tips of the ground wires can be spaced apart from each other and can be connected to a connector section 43*a*. The connector section 43*a* is removably attached to the connector section 22*b*. In some cases, the connector section 43*a* can be attached to or detached from the connector section 22*b* by moving the connector section 43*a* in the fore and aft direction relative to the connector section 22*b*. When the connector section 43*a* is attached to the connector section 22*b*, the ground wires of the wire harness 42*a* can be divided and connected to the ground terminals 36*a*, as shown in FIG. 5.

With respect to FIGS. 3 and 6, the wire harness 42*b* is also configured to provide electrical communication between one or more of electrical components of the watercraft and the ground wire connection structure 20. The illustrated wire harness 42*b* comprises a bundle of ground wires. The tips of the ground wires can be spaced apart from each other and are preferably coupled to a connector section 43*b*. The connector section 43*b* can be attached to or detached from the connector section 22*c* by moving the connector section 43*b* in the fore and aft direction relative to the connector section 22*a*. When the connector section 43*b* is attached to the connector section 22*c*, the ground wires of the wire harness 42*b* can be connected to the associated ground terminals 36*b*.

Each connector section 43*a*, 43*b* can have an engaging concavity that engages a corresponding projection 34*b*, 34*c*. The engaging cavities and the projections 34*b*, 34*c* cooperate to maintain the connections between the respective ground wires of the wire harness and the associated ground terminal.

In the illustrated embodiment, electrical devices of the watercraft 10 are connected to the wire harnesses 42*a*, 42*b*. As such, these electrical devices are in electrical communication with the oil tank 16 through the respective ground terminals 36*a*, 36*b*, bus bars 28*a*, 28*b*, and base body 22*a*. Hence, currents can flow from one or more electrical devices to the oil tank 16.

To operate the watercraft 10, an operator can first turn on a switch proximate the steering handlebars 12 to start running the watercraft 10. The operator steers the watercraft 10 by moving the steering handlebars 12 and operates a throttling member on a grip of the steering handlebars 12 to control vehicle speed.

During operation of the watercraft 10, various electrical devices can be connected to the oil tank 16 through the ground wires of the wire harnesses 42*a*, 42*b* and the ground wire connecting structure 20. Currents can flow from these electrical devices to the oil tank 16. In some embodiments, even if water enters the body 11 of the watercraft 10, water is inhibited from entering the internal components of the ground wire connecting structure 20. In such embodiments, the ground wire connecting structure 20 can be exposed to water without substantially affecting the conductivity between the ground wire connecting structure 20 and the oil tank 16.

The O-ring 29 is provided around the contact area between the ground surface 21*a* and the contact portion 23 of the base body 22*a*. The O-ring 29 inhibits the passage of water between the contacting portion 23*b* and the body 22*a*. Thus, a water tight seal can be formed to limit effectively the amount of water contacting the contact area 23*b*. To form an effective seal, the O-ring 29 can be compressed between the base body 22*a* and the ground surface 21*a*. Further, the layer 37 effectively protects the joint unit 22 from water. That is, the layer 37 inhibits the passage of water into the attachment recess 27*b* of the joint unit 22. The layer 37 can also protect and prevent water from contacting the bus bars. A suitable electrical connection can be maintained so that the electrical devices of the watercraft 10 are grounded.

The base body 22*a* preferably comprises a conductive material, such as aluminum and/or its alloys. Preferably, at least a portion of the base body 22*a* engaging the bus bars 28*a*, 28*b* is constructed of aluminum or its alloys. The base body 22*a* also contacts the ground surface 21*a*. The back side of the base body 22*a* has the contact portion 23 that can contact the ground surface 21*a* to form a relatively large contact zone. The large contact zone provides enhanced conductivity. The contact area between the contact portion 23 of the base body 22*a* and the ground surface 21*a* can be equal to or greater than the total cross-sectional area of the ground terminals 36*a*, 36*b*. In some embodiments, the contact area between the contact portion 23 of the base body 22*a* and the ground surface 21*a* is preferably substantially greater than the total cross-sectional area of the ground terminals 36*a*, 36*b*. Currents flowing from the respective ground wires of the wire harnesses 42*a*, 42*b* can be efficiently discharged to the ground surface 21*a*.

The ground surface 21*a* of the oil tank 16 has the three threaded holes 21*c*. The marginal area of the contact portion 23 of the base body 22*a* has the three through holes 24*a*, 25*a*, 26*a*. Bolts 35*a* can be inserted into the through holes 24*a*, 25*a*, 26*a* and are threadably coupled to the attachment support 21. In this manner the base body 22*a* and oil tank 16 are assembled. In the illustrated embodiment, the bolts 35*a* are screwed into to the threaded holes 27*c* to couple the base body 22*a* securely to the ground surface 21*a*. As such, the base body 22*a* can be held against the ground surface 21*a*. Also, in some embodiments, the overall dimensions of the ground wire connecting structure 20 can be reduced. The base body 22*a* can be large enough to receive the bus bars 28*a*, 28*b* and the connector units 22*b*, 22*c*. The base body 22*a* can thus be compactly formed and can contribute to miniaturizing the ground wire connecting structure 20.

The base body 22*a* has the groove 23*a* that surrounds the contact surface 23*b*. The O-ring 29 cooperates with the groove 23*a* to form a water tight seal between the base body 22*a* and the oil tank 16. The water or other contaminates are inhibited (preferably substantially prevented) from passing between the ground surface 21*a* and the contact surface 23*b* of the base body 22*a*. As such, the ground surface 21*a* of the oil tank 16 and the contact portion 23 of the base body 22*a* form an effective electrical connection such that current can flow through the base body 22*a* to the oil tank 16 without interference from contaminates. Oxidation of the ground surface 21*a* and/or the base body 22*a* by the water (e.g., seawater) can be substantially limited or prevented. Also, because both the oil tank 16 and the base body 22*a* are made of the same metal (e.g., an aluminum alloy), the ground surface 21*a* and the base body 22*a* can have the same potential thereby minimizing electrolytic corrosion. In other words, the surfaces of the structure 20 and the oil tank 16 that contact each other can have a similar corrosion compatibility to reduce overall corrosion, thus maintaining effective conductivity between the ground surface 21*a* and the base body 22*a*. Accordingly, the working life of ground wire connecting structure can be improved.

The seal layer 37 can comprise resin material and is preferably disposed in the attachment recess 27*b* of the joint unit 22. Water (e.g., seawater or the like) is therefore prevented from soaking the bus bars 28*a*, 28*b* and/or the bolts 35*b*. The resin material can comprise any material suitable for encapsulating these components and contacting water if desired.

Various electrical devices are disposed in the central area of the body 11. The ground surface 21*a* is formed in the surface of the oil tank 16 that is positioned in the central area of the body 11. The respective lengths of the wire harnesses 42*a*, 42*b* extending from the devices can be reduced, and the respective ground wires of the wire harnesses 42*a*, 42*b* can be easily connected to the associated ground terminals 36*a*, 36*b* of the joint unit 22. Hence, the overall size of the electrical system can be reduced. It should be appreciated that the oil tank 16 can be at other locations also.

The ground wire connecting structure 20 is provided in a watercraft 10 and configured to cooperate with a portion of the oil tank 16. The oil tank 16 can be disposed proximate the engine 15. The illustrated oil tank 16 in FIGS. 1 and 2 is positioned behind an engine 15. The engine 15 and the oil tank 16 can be generally positioned in the center of a body 11 of the watercraft 10. As such, the length of the ground wires extending from various devices of the watercraft 10 to the structure 20 can be reduced. The compact design and position of the engine 15 and oil tank 16 can reduce the required length of the ground wires that provide communication to the ground wire connecting structure 20. Additionally, the ground wires can be conveniently connected to the ground terminals of the joint unit for easy assembly.

The ground wire connecting structure 20 is not limited to the embodiment describe above, and can be properly varied. For example, although the attachment recess 27*b* generally houses the seal layer 37 in the embodiment described above, other portions in the joint unit 22 and around it (preferably except for the connector sections 22*b*, 22*c*) can have such a seal layer. Hence, waterproofing can be further improved various portions of the ground wire connecting structure 20 can be encapsulated by a sealing material. In another alternative, some portions such as, for example, a border between the ground surface 21*a* and the base body 22*a* can have a seal layer. The seal layer can further prevent contaminants from interfering with the electrical connection between the structure 20 and the oil tank 16. In view of the present disclosure, a skilled artisan will readily recognize that one or more sealing layers can be employed to properly form barriers for inhibiting the ingress of contaminates into the ground wire connecting structure 20.

The oil tank 16 and the base body 22*a* are preferably made of an aluminum alloy in the embodiment described above. However, metallic materials other than aluminum alloys can be employed. Also, other materials, even if not metallic materials, are applicable if they are somewhat conductive. The oil tank 16 and the base body 22*a* can be made of different materials from each other. Also, the ground wire connecting structure 20 can be applied not only to the watercraft 10 but also to a wide variety of vehicles such as, for example, a motorcycle, a motorcar, snowmobile, etc. Further, the ground wire connecting structure 20 can be disposed at any surface that is the structure 20 can be disposed at other surfaces than the surface of the oil tank 16. For example, the structure 20 can be mounted to a body panel, frame, engine component, or other suitable body member for mounting of the structure 20.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A ground wire connecting structure for grounding a circuit to a watercraft component, the ground wire connecting structure comprising a joint unit having a joint unit body and a conductive member mounted thereto, the joint unit body comprising a conductive material that is in electrical communication with the conductive member, at least one joint unit side connector section being attached to the joint unit body, the at least one joint unit side connector section being configured to accommodate a ground terminal connected to the conductive member, the watercraft component defining a ground surface, the joint unit body defining a contact surface being sized and configured such that at least a portion of the contact surface abuts the ground surface when the joint unit body is attached to the watercraft component, the joint unit body further comprising a seal being disposed along the contact surface within an outer periphery of the contact surface, the seal defining an inner contact area wherein at least a portion of the ground surface and at least a portion of the contact surface are in isolated electrical contact, the seal being disposed intermediate the contact surface and the ground surface for preventing ingress of contaminants into the contact area, the ground surface being comprised of a conductive material such that the ground surface and the conductive member are electrically coupled together, an external connector section being coupled to an external ground wire and the at least one joint unit side connector section, the ground wire and the ground terminal are coupled together so that the external ground wire and the ground surface are in electrical communication, the joint unit body being detachably attached to the ground surface via at least one fastening assembly.

2. The ground wire connecting structure of claim 1, wherein the seal is formed by a sealing member at least partially disposed in a groove that surrounds at least a portion of the contact surface, and the sealing member is pressed against the ground surface.

3. The ground wire connecting structure of claim 1, further comprising an O-ring positioned in a substantially annular groove formed along a peripheral edge of the contact portion of the joint unit body.

4. The ground wire connecting structure of claim 1, wherein the joint unit body and the ground surface comprise the same conductive metallic material.

5. The ground wire connecting structure of claim 1, further comprising a plurality of fasteners that couple the conductive member to the joint unit body.

6. The ground wire connecting structure of claim 1, further comprising a seal layer that encapsulates the conductive member, wherein the seal layer is made by applying a molten resin material and then solidifying the resin material.

7. The ground wire connecting structure of claim 1, wherein the at least one fastening assembly comprises a plurality of first holes spaced from each other and formed in an outer periphery of the contact portion of the joint unit body and a plurality of threaded second holes extending through the ground surface, and threaded fasteners are disposed in aligned pairs of the first and second holes.

8. The ground wire connecting structure of claim 1, wherein the contact area between the contact portion of the joint unit body and the ground surface is equal to or larger than a cross-sectional area of the ground terminal.

9. The ground wire connecting structure of claim 1, wherein the watercraft component is an oil tank of a watercraft.

10. A watercraft comprising a first electrical device and a ground wire connecting structure, the ground wire connecting structure comprising a joint unit having a joint unit body and a first joint unit side connector section attached to the joint unit body, the first electrical device being connected to the first joint unit side connector section of the ground wire connecting structure by at least one ground wire, the joint unit being attached to a ground surface defined by a watercraft component, the joint unit body defining a contact surface being sized and configured such that at least a portion of the contact surface abuts the ground surface when the joint unit body is attached to the watercraft component, the joint unit body further comprising a seal being disposed along the contact surface within an outer periphery of the contact surface, the seal defining an inner contact area wherein at least a portion of the ground surface and at least a portion of the contact surface are in isolated electrical contact, the seal being disposed intermediate the contact surface and the ground surface for preventing ingress of contaminants into the contact area, the ground surface and the contact surface of the joint unit each being made of conductive materials such that the ground surface and a first conductive member mounted to the joint unit body are electrically coupled together, and a fastening assembly that couples the joint unit body to the ground surface.

11. The watercraft of claim 10, further comprising a second joint unit side connector section attached to the joint unit body, a second electrical device is connected to the second joint unit side connector section of the ground wire connecting structure by a second ground wire, and a second conductive member spaced from the first conductive member and mounted to the joint unit body to electrically couple the second conductive member to the ground surface.

12. The watereraft of claim 10, wherein at least a portion of the joint unit body is interposed between the ground surface and the first conductive member such that an electrical path extends between the ground surface and the first conductive member.

13. The watereraft of claim 10, wherein the fastening assembly comprises a threaded bolt that extends through the joint unit body and the ground surface.

14. The watercraft of claim 10, wherein the joint unit body is comprised of a conductive material that is electrically coupled with the first conductive member, and the first conductive member is a bus bar.

15. The watercraft of claim 10, wherein the at least one ground wire and a ground terminal are coupled together, and the ground terminal extends between the conductive member and the joint unit side connector section.

16. The watercraft of claim 10, wherein the seal is formed by a sealing member being at least partially disposed in a groove in the joint unit body that surrounds at least a portion of the contact surface of the joint unit body, and the sealing member being compressed between the ground surface and the contact surface.

17. The watercraft of claim 10, wherein the joint unit body and the ground surface comprise the same conductive metallic material.

18. The watercraft of claim 10, further comprising a seal layer that encapsulates the conductive member and at least a portion of the joint unit body to substantially prevent water from contacting the conductive member.

19. The watercraft of claim 10, wherein the contact area between the contact portion of the joint unit body and the ground surface is equal to or greater than a cross-sectional area of a ground terminal.

20. The watereraft of claim 10, wherein the ground surface is formed on a surface of an oil tank of a watercraft.

* * * * *

UNITED STATES PATENT AND TRADEMARK OFFICE

CERTIFICATE OF CORRECTION

PATENT NO. : 7,259,330 B2
APPLICATION NO. : 11/232533
DATED : August 21, 2007
INVENTOR(S) : Akuzawa et al.

It is certified that error appears in the above-identified patent and that said Letters Patent is hereby corrected as shown below:

At column 3, line 31, please delete “e.g.” and insert -- e.g., --, therefore.

At column 14, line 17, in Claim 12, please delete “waterecraft” and insert

-- watercraft --, therefore.

At column 14, line 22, in Claim 13, please delete “waterecraft” and insert

-- watercraft --, therefore.

At column 14, line 51, please delete “waterecraft” and insert -- watercraft --, therefore.

Signed and Sealed this

Twenty-fifth Day of December, 2007

JON W. DUDAS
*Director of the United States Patent and Trademark Office*